(12) United States Patent
Zhao et al.

(10) Patent No.: US 11,963,173 B2
(45) Date of Patent: *Apr. 16, 2024

(54) DATA TRANSMISSION METHOD AND TERMINAL DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Huei-Ming Lin, South Yarra (AU); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,301

(22) Filed: Dec. 28, 2021

(65) Prior Publication Data

US 2022/0124696 A1 Apr. 21, 2022

Related U.S. Application Data

(63) Continuation of application No. 17/240,869, filed on Apr. 26, 2021, now Pat. No. 11,246,120, which is a
(Continued)

(30) Foreign Application Priority Data

Nov. 1, 2018 (WO) ............... PCT/CN2018/113444

(51) Int. Cl.
*H04W 72/20* (2023.01)
*H04W 52/18* (2009.01)

(52) U.S. Cl.
CPC ........... *H04W 72/20* (2023.01); *H04W 52/18* (2013.01)

(58) Field of Classification Search
None
See application file for complete search history.

(56) References Cited

U.S. PATENT DOCUMENTS 11,246,120 B2 * 2/2022 Zhao ............... H04W 52/18
2010/0110960 A1 5/2010 Kim et al.
(Continued)

FOREIGN PATENT DOCUMENTS

CN 106575995 A 4/2017
CN 107318086 A 11/2017
(Continued)

OTHER PUBLICATIONS

First Office Action issued in corresponding Canadian Application No. 3,118,240, dated May 6, 2022.
(Continued)

*Primary Examiner* — Nguyen H Ngo
(74) *Attorney, Agent, or Firm* — BAYES PLLC

(57) ABSTRACT

The embodiment of the present disclosure relates to a data transmission method and a terminal device. The method includes if a terminal device determines, according to first configuration information, to perform a first type of transmission on a target transmission resource, and determines, according to second configuration information, to perform a second type of transmission on the target transmission resource, the terminal device determines whether the first type of transmission or the second type of transmission is a target type of transmission according to a first preset rule, wherein the first type of transmission is sidelink transmission between the terminal device and another terminal device, and the second type of transmission is uplink transmission or downlink transmission between the terminal
(Continued)

device and a network device; and performing data transmission on the target transmission resource by using the target type of transmission.

20 Claims, 4 Drawing Sheets

Related U.S. Application Data continuation of application No. PCT/CN2019/087092, filed on May 15, 2019.

(56) References Cited

U.S. PATENT DOCUMENTS

| | | | |
|---|---|---|---|
| 2017/0105198 A1 | 4/2017 | Fu et al. | |
| 2018/0019794 A1 | 1/2018 | Kowalski et al. | |
| 2018/0317123 A1 | 11/2018 | Chen et al. | |
| 2020/0045724 A1* | 2/2020 | Lu | H04W 72/14 |
| 2020/0059944 A1* | 2/2020 | Lee | H04W 4/40 |
| 2020/0404564 A1 | 12/2020 | Kim et al. | |
| 2021/0153170 A1* | 5/2021 | Chen | H04W 72/0446 |
| 2021/0176735 A1* | 6/2021 | Deng | H04W 72/02 |
| 2021/0195587 A1* | 6/2021 | Kaikkonen | H04L 5/14 |

FOREIGN PATENT DOCUMENTS

| | | |
|---|---|---|
| CN | 107371182 A | 11/2017 |
| CN | 108282278 A | 7/2018 |
| CN | 108293250 A | 7/2018 |
| CN | 108307419 A | 7/2018 |
| CN | 108322414 A | 7/2018 |
| CN | 108347313 A | 7/2018 |
| RU | 2656094 C2 | 5/2018 |
| WO | 2017026844 A1 | 2/2017 |
| WO | 2017171528 A1 | 10/2017 |
| WO | 2018074876 A1 | 4/2018 |
| WO | 2018082571 A1 | 5/2018 |

OTHER PUBLICATIONS

First Office Action issued in corresponding Chinese application No. 202110430477.3, dated Aug. 10, 2022.
First Office Action issued in corresponding Russian application No. 2021114212, dated Jul. 25, 2022.
Notice of Allowance issued in corresponding Chinese application No. 202110430477.3, dated Oct. 24, 2022.
First Office Action issued in corresponding Indian application No. 202127023291, dated Dec. 8, 2022.
Extended European Search Report issued in corresponding European application No. 22215260.5, dated Feb. 8, 2023.
First Office Action issued in corresponding Japanese application No. 2021-523390, dated May 16, 2023.
3GPP TS 36.213 V15.5.0 (Mar. 2019); 3rd Generation Partnership Project; Technical Specification Group Radio Access Network; Evolved Universal Terrestrial Radio Access (E-UTRA); Physical layer procedures (Release 15).
OPPO (rapporteur), "Summary of [Offline#704] UL/SL prioritization", R2-1908291, 3GPP TSG-RAN WG2 Meeting #106 Reno, US., May 13-May 17, 2019.
ASUSTeK, "Discussion on UL/SL TX prioritization", R2-1901036, 3GPP TSG-RAN2 Meeting #105 Athen, Greece, Feb. 25-Mar. 1, 2019.
Vivo, "Uplink and Sidelink transmission prioritization in NR V2X", R2-1905847, 3GPP TSG-RAN WG2 Meeting #106 Reno, US, May 13-17, 2019.
Fujitsu, "Discussion on HARQ-ACK feedback for NR-V2X", R1-1901944, 3GPP TSG RAN WG1 #96, Athens, Greece, Feb. 25-Mar. 1, 2019.
CATT, "Prioritization of UU and SL for NR V2X", R2-195803, 3GPP TSG-RAN WG2 Meeting #106 Reno, USA, May 13-17, 2019.
Spreadtrum Communications, "Discussion on sidelink physical layer structures and procedure(s)", R1-1811010, 3GPP TSG RAN WG1 Meeting #94bis Chengdu, China, Oct. 8-12, 2018.
Nokia et al., "Tx power allocation in SL CA", R1-1720486, 3GPP TSG-RAN WG1 Meeting #91 Reno, USA, Nov. 27-Dec. 1, 2017.
LG Electronics Inc., "Coexistence of transmission of V2X sidelink communication and Uu", R2-168766, 3GPP TSG-RAN2 Meeting #96 Reno, U.S.A., Nov. 14-18, 2016.
Samsung, "Further Considerations on Uu/PC5 Prioritization", R2-1701280, 3GPP TSG-RAN WG2 Meeting #97 Athens, Greece, Feb. 13-17, 2017.
WO, International Search Report, PCT/CN2018/113444 dated Jul. 25, 2019, 26 pages.
PCT Written Opinion of the International Searching Authority issued in corresponding International Application No. PCT/CN2018/113444 dated Jul. 25, 2019, 7 pages.
WO, International Search Report, PCT/CN2019/087092, dated Aug. 15, 2019, 28 pages.
PCT Written Opinion of the International Searching Authority issued in corresponding International Application No. PCT/CN2019/087092, dated Aug. 20, 2019, 8 pages.
"Discussion on sidelink physical layer structures and procedure(s)", Agenda Item: 7.2.4.1.2, Source: Spreadtrum Communications, 3GPP TSG RAN WG1 Meeting #94bis R1-1811010, Chengdu, China, Oct. 8-12, 2018, 7 pages.
"Tx power allocation in SL CA", Agenda item: 6.2.3.1.3, Source: Nokia, Nokia Shanghai Bell, 3GPP TSG-RAN WG1 Meeting #91 R1-1720486, Reno, USA, Nov. 27-Dec. 1, 2017, 2 pages.
"Coexistence of transmission of V2X sidelink communication and Uu", Agenda item: 8.13.7, Source: LG Electronics Inc., 3GPP TSG-RAN2 Meeting #96 R2-168766, Reno, U.S.A., Nov. 14-18, 2016, 3 pages.
Extended European Search Report issued in corresponding European Application No. 19879879.5, dated Nov. 24, 2021, 12 pages.
"UL/SL prioritization in eV2x", Agenda Item: 9.10.3, Source: OPPO, 3GPP TSG-RAn WG2 Meeting #103, R2-1811092, Gothenburg, Sweden, Aug. 20-24, 2018, 3 pages.
"Further Considerations on Uu/PCS Prioritization", Agenda item: 8.13.9, Source: Samsung, 3GPP TSG-RAN WG2 Meeting #97, R2-1701280, Athens, Greece, Feb. 13-17, 2017, 3 pages.

\* cited by examiner

DATA TRANSMISSION METHOD AND TERMINAL DEVICE

CROSS-REFERENCE TO RELATED APPLICATIONS

This application is a continuation of U.S. patent application Ser. No. 17/240,869, filed on Apr. 26, 2021, entitled "DATA TRANSMISSION METHOD AND TERMINAL DEVICE," which is a continuation of International Application No. PCT/CN2019/087092, filed on May 15, 2019, entitled "DATA TRANSMISSION METHOD AND TERMINAL DEVICE," which claims the benefit of priority to International Application No. PCT/CN2018/113444, filed on Nov. 1, 2018, entitled "DATA TRANSMISSION METHOD AND TERMINAL DEVICE", all of which are incorporated herein by reference in their entireties.

BACKGROUND

This present disclosure relates to the field of communications, and in particular to a method for transmitting data and a terminal device.

A Vehicle to Everything (V2X) system is a kind of sidelink (SL) transmission technology based on Long Term Evolution (LTE) Device to Device (D2D), and different from the traditional LTE system in which the communication data is received or sent through a base station, the V2X system adopts terminal-to-terminal direct communication, and thus has higher spectrum efficiency and lower transmission delay.

In a NR system, different slot structures are supported in a cell, that is, one or more of downlink symbols, uplink symbols, and flexible symbols can be included in a slot, and the number of the symbols is configurable. The flexible symbol indicates an uncertain transmission direction, but the transmission direction can be changed through other configuration information or downlink control information. For example, a network device can configure a flexible symbol for sidelink transmission, or for uplink or downlink transmission.

SUMMARY

The embodiments of the present disclosure provide a data transmission method and a terminal device.

According to a first aspect, a data transmission method is provided, including: determining, by a terminal device according to a first preset rule, a first type of transmission or a second type of transmission as a target type of transmission when the terminal device determines, according to first configuration information, to perform the first type of transmission on a target transmission resource and determines, according to second configuration information, to perform the second type of transmission on the target transmission resource, where the first type of transmission is sidelink transmission between the terminal device and other terminal devices, and the second type of transmission is uplink transmission or downlink transmission between the terminal device and a network device; and performing data transmission with the target type of transmission on the target transmission resource.

According to a second aspect, a data transmission method is provided, including: performing, by a terminal device according to a preset rule, sidelink transmission on a target transmission resource with a first power and uplink transmission on the target transmission resource with a second power when the terminal device determines, according to first configuration information, to perform the sidelink transmission with other terminal devices on the target transmission resource and determines, according to second configuration information, to perform the uplink transmission with a network device on the target transmission resource, wherein, a sum of the first power and the second power is less than or equal to a maximum transmission power of the terminal device.

According to a third aspect, a terminal device is provided, which is configured to perform the method in any one of the foregoing first to second aspects or the implementations thereof. Specifically, the terminal device includes functional modules for performing the method in the foregoing first aspect or the implementations thereof.

According to a fourth aspect, there is provided a terminal device including a processor and a memory. The memory is used for storing a computer program, and the processor is configured to call and run the computer program stored in the memory to perform the method in any one of the above-mentioned first to second aspects or the implementations thereof.

According to a fifth aspect, a chip is provided for implementing the method in any one of the first to the second aspects or the implementations thereof. Specifically, the chip includes a processor configured to call and run a computer program from a memory to cause a device installed with the chip to perform the method in any one of the above-mentioned first aspect to the second aspect or the implementations thereof.

According to a sixth aspect, there is provided a computer-readable storage medium for storing a computer program that causes a computer to carry out the method in any one of the above-mentioned first to the second aspects or the implementations thereof.

According to a seventh aspect, there is provided a computer program product including computer program instructions that cause a computer to perform the method in any one of the above-mentioned first to the second aspects or the implementations thereof.

According to an eighth aspect, there is provided a computer program which, when running on a computer, causes the computer to perform the method in any one of the above-mentioned first to the second aspects or the implementations thereof.

DETAILED DESCRIPTION

The technical solutions in the embodiments of the present disclosure will be described below in connection with the drawings in the embodiments of the present disclosure. Obviously, the described embodiments are part of the embodiments of the present disclosure, but not all the embodiments. Based on the embodiments in the present disclosure, all other embodiments obtained by those of ordinary skill in the art without creative work fall within the protection scope of the present disclosure.

The technical solutions of the embodiments of the present disclosure can be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, a 5G system, etc.

Figure 1:
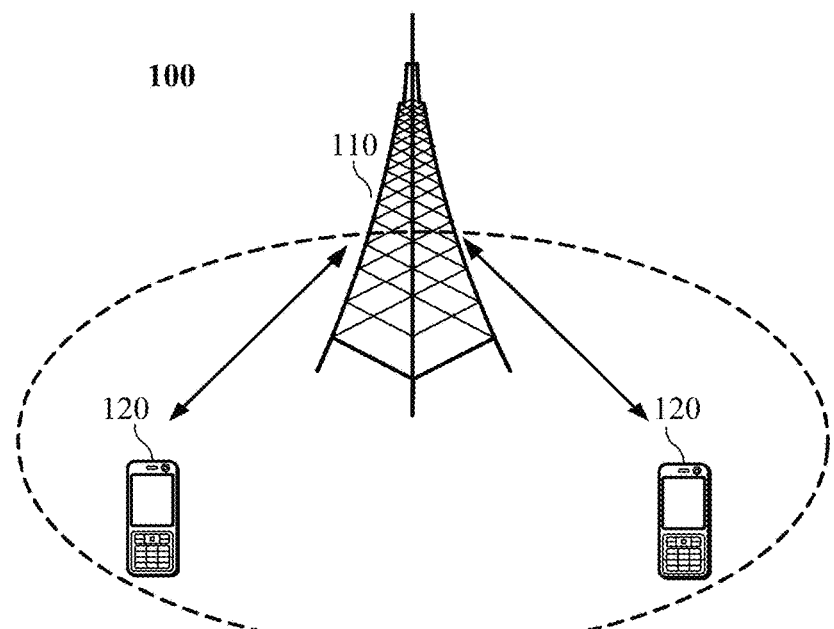
FIG. 1 is a schematic diagram of a communication system architecture according to an embodiment of the present disclosure.

For example, a communication system to which the embodiments of the present disclosure are applied is as shown in FIG. 1. The communication system 100 may include a network device 110 which may be a device that communicates with a terminal device 120 (or referred to as a communication terminal or a terminal). The network device 110 can provide communication coverage for a specific geographic area, and can communicate with terminal devices located in the coverage area. Optionally, the network device 110 can be a Base Transceiver Station (BTS) in a GSM system or a CDMA system, a NodeB (NB) in a WCDMA system, an Evolutional Node B (eNB or eNodeB) in an LTE system, or a wireless controller in a Cloud Radio Access Network (CRAN). Optionally, the network device can be a mobile switching center, a relay station, an access point, an on-board device, a wearable device, a hub, a switch, a bridge, a router, a network side device in 5G network, a network device in future evolutional Public Land Mobile Network (PLMN), or the like.

The communication system 100 also includes at least one terminal device 120 located within the coverage range of the network device 110. As used herein, the terminal device includes, but is not limited to, a device configured to receive/send communication signals and/or an Internet of Things (IoT) device, which may be connected with another device via wired lines, such as Public Switched Telephone Networks (PSTN), Digital Subscriber Line (DSL), digital cables, and direct cable connections; and/or via another data connection/network; and/or via a wireless interface, such as cellular networks, wireless local area networks (WLAN), digital TV networks such as DVB-H networks, satellite networks, AM-FM broadcast transmitter. A terminal device configured to communicate through a wireless interface may be referred to as a "wireless communication terminal", a "wireless terminal" or a "mobile terminal". Examples of the mobile terminal include but are not limited to satellite or cellular phones; Personal Communications System (PCS) terminals that can combine cellular radio phones with data processing, fax, and data communication capabilities; PDA that may include radio phones, pagers, Internet/intranet access, Web browser, memo pad, calendar, and/or Global Positioning System (GPS) receiver; and conventional laptop and/or palmtop receivers or other electronic devices including radio telephone transceivers. The terminal device may refer to access terminals, user equipment (UE), user units, user stations, mobile stations, mobile sites, remote stations, remote terminals, mobile equipment, user terminals, terminals, wireless communication equipment, user agents, or user device. The access terminal may be a cellular phone, a cordless phone, a Session Initiation Protocol (SIP) phone, a wireless local loop (WLL) station, a personal digital assistant (PDA), and wireless communication functional handheld devices, computing devices or other processing devices connected to wireless modems, in-vehicle devices, wearable devices, terminal devices in 5G networks, terminal devices in the future evolution of PLMN, or the like.

Optionally, Device to Device (D2D) communication may be performed between the terminal devices 120.

Optionally, the 5G system or 5G network may also be referred to as a New Radio (NR) system or NR network.

FIG. 1 exemplarily shows one network device and two terminal devices. Optionally, the communication system 100 may include multiple network devices and other numbers of terminal devices can be included in the coverage of each network device, which is not particularly limited in the embodiments of the present disclosure.

Optionally, the communication system 100 may also include other network entities such as a network controller and a mobility management entity, which are not limited in the embodiments of the present disclosure.

It should be understood that the device with a communication function in the network and/or system of the embodiments of the present disclosure may be referred to as the communication device. Taking the communication system 100 shown in FIG. 1 as an example, the communication device may include a network device 110 and a terminal device 120 which have the communication function. The network device 110 and the terminal device 120 may be the specific devices as described above, which will not be repeated here. The communication device may also include other devices in the communication system 100, such as a network controller, a mobility management entity, and other network entities, which are not limited in the embodiments of the present disclosure.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

Figure 2:
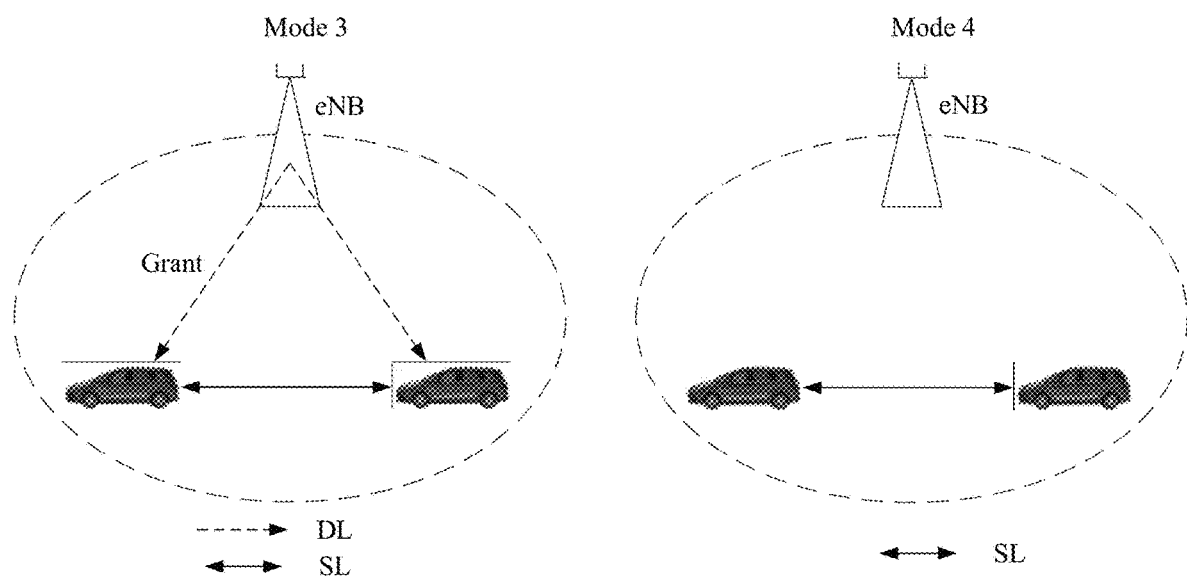
FIG. 2 is a schematic diagram of a sidelink system according to an embodiment of the present disclosure.

The V2X technologies are standardized in 3GPP Release 14 (Rel-14), and two transmission modes are defined: Mode 3 and Mode 4. FIG. 2 shows a schematic diagram of the two transmission modes in the V2X system according to an embodiment of the present disclosure.

As shown in FIG. 2, the mode 3 on the left indicates that the transmission resources of an on-vehicle terminal are allocated by the base station through a downlink (DL), and the on-vehicle terminal transmits data on the sidelink according to the resources allocated by the base station. The base station can allocate resources for a single transmission for the terminal, or can allocate semi-static transmission resources for the terminal.

As shown in FIG. 2, the mode 4 on the right indicates that the on-vehicle terminal adopts a sensing and reservation transmission method. The on-vehicle terminal obtains a set of available transmission resources in a resource pool by sensing, and randomly selects a resource from the set for data transmission. Since the services in the V2X system have periodic characteristics, the terminal usually adopts the semi-static transmission method, that is, after selecting a transmission resource, the terminal will continue to use this resource in multiple transmission cycles so as to reduce resource reselection and the probability of resource conflicts. The terminal will carry information for reserving the resource for a next transmission in the control information of the current transmission, so that other terminals can determine whether such resource is reserved and used by the user by detecting the control information of the user, so as to achieve the purpose of reducing the resource conflicts.

In LTE-V2X, the sidelink transmission can be performed by using a dedicated carrier or a carrier shared with the uplink. When the shared carrier is used, the sidelink can only use uplink transmission resources, such as uplink subframes of a TDD system or an uplink carrier in a FDD system, and the sidelink cannot use downlink resources so as to avoid interference to the terminal.

In the NR system, different slot structures are supported in a cell, that is, one or more of downlink symbols, uplink symbols, and flexible symbols can be included in a slot, and the number of various symbols is configurable. The flexible symbol indicates an uncertain transmission direction, but the transmission direction can be changed through other configuration information or downlink control information, for example, the flexible symbol can be changed to the downlink symbol or the uplink symbol through Downlink Control Information (DCI), or the transmission direction is implicitly determined by configuration information. For example, if the transmission of a Synchronization Signal Block (SSB) is configured on the flexible symbol, it can be determined that this symbol is for the downlink transmission.

Figures 3, 4, 5:
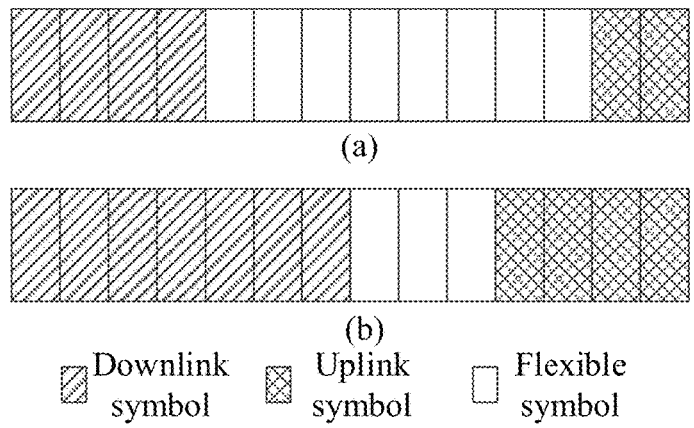
FIG. 3 is a schematic diagram of a slot structure according to an embodiment of the present disclosure.
FIG. 4 is a schematic flowchart of a data transmission method according to an embodiment of the present disclosure.
FIG. 5 is a schematic flowchart of a data transmission method according to another embodiment of the present disclosure.

In the NR system, each slot can include 14 symbols or 7 symbols, one or more of the downlink symbol, the uplink symbol and the flexible symbol can be set in each slot, and the number of the symbols is configurable. For example, FIG. 3 shows a schematic diagram of a symbol distribution in the slot structure according to an embodiment of the present disclosure. As shown in FIG. 3, the slot includes 14 symbols, and the downlink symbols, the flexible symbols and the uplink symbols are sequentially distributed chronologically in each slot. In the slot structure of Figure a, one slot includes 4 downlink symbols, 2 uplink symbols, and the rest are flexible symbols; in the slot structure of Figure b, one slot includes 7 downlink symbols, 4 uplink symbols, and the rest are flexible symbols, but the embodiments of the present disclosure are not limited thereto.

In the NR-V2X system, the network device can configure the symbols in the slot to be used for the uplink transmission, the downlink transmission or the sidelink transmission. If a transmission resource is used for both the sidelink transmission and the uplink transmission, for example, the flexible symbols in a slot can be used for the sidelink transmission and the flexible symbols can also be configured for the uplink or downlink transmission, how to determine the data transmission on such resources is a problem to be solved. Therefore, according to an embodiment of the present disclosure, there is proposed a data transmission method, which can avoid conflicts between the sidelink transmission and the uplink or downlink transmission.

FIG. 4 is a schematic flowchart of a data transmission method 200 according to an embodiment of the present disclosure. The method 200 may be performed by a terminal device. For example, the terminal device may be the terminal device shown in FIG. 1 or FIG. 2, which can perform uplink and downlink transmission with a network device, and can also perform sidelink transmission with other terminal devices. As shown in FIG. 4, the method 200 includes: S210, determining, by the terminal device according to a first preset rule, a first type of transmission or a second type of transmission as a target type of transmission when the terminal device determines, according to first configuration information, to perform the first type of transmission on a target transmission resource and determines, according to second configuration information, to perform the second type of transmission on the target transmission resource, where the first type of transmission is sidelink transmission between the terminal device and other terminal devices, and the second type of transmission is uplink transmission or downlink transmission between the terminal device and a network device; and S220, performing data transmission with the target type of transmission on the target transmission resource.

It should be understood that prior to S210, the method 200 further includes that determining, by the first terminal device according to the first configuration information, to perform the first type of transmission on the target transmission resource, the first type of transmission being the sidelink transmission between the terminal device and other terminal devices. In addition, the method 200 further includes determining, by the terminal device according to the second configuration information, to perform the second type of transmission on the target transmission resource, the second type of transmission being the uplink or downlink transmission between the terminal device and the network device. That is, both the uplink or downlink transmission and the sidelink transmission are configured on the same target transmission resource, and resource conflicts may occur.

Optionally, the first configuration information may be configured by the network device for the terminal device, that is, the terminal device receives the first configuration information sent by the network device. Alternatively, the first configuration information may also be pre-configured information. For example, the first configuration information may be scheduling information or resource pool configuration information sent by the network device, and the terminal device determines to use the target resource for the sidelink transmission according to the first configuration information. For another example, the first configuration information may be pre-configured information, that is, specified in accordance with an agreement, or pre-stored on the terminal device.

Optionally, the second configuration information may be configured by the network device for the terminal device, that is, the terminal device receives the second configuration information sent by the network device. For example, the second configuration information may be Radio Resource Control (RRC) configuration information or scheduling information, and the network device configures the terminal device to use the target resource for uplink data transmission through the second configuration information. For another example, the second configuration information may be broadcast information or RRC configuration information, and the network device configures the terminal device to use the target resource to transmit downlink data through the second configuration information.

It should be understood that the target transmission resource in the embodiments of the present disclosure may be a time-frequency resource, or a time-domain resource. Specifically, if the target transmission resource is the time domain resource, the terminal device determines, according to the first configuration information, to use the time domain resource for the first type of transmission, that is, the sidelink transmission, and at the same time, the terminal device determines, according to the second configuration information, to use the time domain resources for the second type of transmission, that is, the uplink or downlink transmission, and the frequency domain resources occupied by the sidelink transmission and the frequency domain resources occupied by the uplink or downlink transmission may be the same or different.

For example, the target transmission resource is a time domain symbol, and the terminal device determines to transmit sidelink data on the time domain symbol according to the first configuration information, and determines to receive downlink data on the symbol according to the second configuration information. At this point, there will be conflicts on transmission directions.

For another example, the target transmission resource may also be a specific time-frequency resource, and the terminal device determines to transmit sidelink data on this time-frequency resource according to the first configuration information, and determines to transmit uplink data on this time-frequency resource according to the second configuration information, and at this point, there is a transmission resource that is used for both the uplink transmission and the sidelink transmission, which will cause transmission resource conflicts.

For still another example, the target transmission resource is a time domain symbol, and the terminal device determines to send sidelink data on a first frequency domain resource of the time domain symbol according to the first configuration information, and determines to send uplink data on a second frequency domain resource of the time domain symbol according to the second configuration information. The first frequency domain resource and the second frequency domain resource are different.

In the embodiments of the present disclosure, since the terminal device determines to perform the first type of transmission and the second type of transmission on the same target transmission resource according to the first configuration information and the second configuration information, the terminal device can determine the first type of transmission or the second type of transmission as the target type of transmission according to the first rule, where the first rule may be pre-configured, for example, it may be specified by an agreement, or the first rule may be configured by the network device for the terminal device, and the embodiments of the present disclosure are not limited thereto.

Optionally, as an embodiment, the first preset rule may be: determining the first type of transmission as the target type of transmission, or determining the second type of transmission as the target type of transmission. Specifically, the first rule may directly specify that the first type of transmission is preferentially performed or that the second type of transmission is preferentially performed. If the first rule specifies that the first type of transmission is preferentially performed, that is, the terminal device prioritizes the transmission of the sidelink data, the terminal device determines the first type of transmission as the target type of transmission, that is, the sidelink transmission is the target type of transmission, and the device performs the sidelink transmission on the target transmission resource, but does not perform the second type of transmission on the target transmission resource. If the first rule specifies that the second type of transmission is preferentially performed, that is, the terminal device prioritizes the transmission of the uplink or downlink data, the terminal device determines the second type of transmission as the target type of transmission, that is, the uplink or downlink transmission is the target type of transmission, and the terminal device performs the uplink or downlink transmission on the target transmission resource, and does not perform the sidelink transmission on the target transmission resource.

Optionally, as an embodiment, the first preset rule may also be: determining the first type of transmission as the target type of transmission if a parameter information set of the first type of transmission meets a preset threshold. Correspondingly, if the parameter information set of the first type of transmission does not meet the preset threshold, the terminal device may determine the second type of transmission as the target type of transmission, or further determine whether to determine the second type of transmission as the target type of transmission or not in combination with other conditions. For example, if the parameter information set of the first type of transmission does not meet a first preset threshold, but the parameter information set of the second type of transmission meets a second preset threshold, the terminal device can determine the second type of transmission as the target type of transmission.

Similarly, the first preset rule may also be: determining the second type of transmission as the target type of transmission if the parameter information set of the second type of transmission meets the second preset threshold. Correspondingly, if the parameter information set of the second type of transmission does not meet the second preset threshold, the terminal device may determine the first type of transmission as the target type of transmission, or determine whether to determine the first type of transmission as the target type of transmission or not in combination with other conditions. For example, if the parameter information set of the second type of transmission does not meet the second preset threshold, but the parameter information set of the first type of transmission meets the first preset threshold, the terminal device may determine the first type of transmission as the target type of transmission.

Optionally, the parameter information set of the first type of transmission may be parameter information including information to be transmitted in the first type of transmission. For example, the terminal device may determine the parameter information set of the first type of transmission according to attribute information of a logical channel of the first type of transmission. Similarly, the parameter information set of the second type of transmission may also be parameter information including information to be transmitted in the second type of transmission. For example, the terminal device may determine the parameter information set of the second type of transmission based on the attribute information of the logical channel of the second type of transmission, and the embodiments of the present disclosure are not limited thereto.

It should be understood that the information to be transmitted in the first type of transmission may include data to be transmitted and/or feedback information to be transmitted, and similarly, the information to be transmitted in the second type of transmission may also include data to be transmitted and/or feedback information to be transmitted, and the embodiments of the present disclosure are not limited thereto.

The first type of transmission or the second type of transmission in the embodiments of the present disclosure may include the transmission of a data channel and/or the transmission of a feedback channel (e.g., a physical control channel carrying retransmission feedback). For the data channel, the parameter information included in the parameter information set can be determined according to the attribute information of the logical channel corresponding to the data channel, such as a priority. For the feedback channel, the parameter information in the parameter information set can be determined according to attributes of the logical channel corresponding to a data channel corresponding to feedback information in the feedback channel.

The parameter information set of the first type of transmission or the second type of transmission includes at least one of the following information: priority information, delay information, reliability information, transmission rate information, throughput information, Quality of Service (QoS) information and QoS Class Identifier (QCI) information. Moreover, the information included in the parameter information set of the first type of transmission may be the same as or different from the information included in the parameter information set of the second type of transmission.

Optionally, based on one or more of the aforementioned priority information, delay information, reliability information, transmission rate information, throughput information, QoS information, and QCI information, the terminal device may also determine the remaining one or more information.

Optionally, the first preset threshold or the second preset threshold may be configured by the network device, or may be pre-configured. For example, the terminal device may receive the first preset threshold sent by the network device, or the terminal device may obtain the second preset threshold according to the pre-configured information.

In an embodiment of the present disclosure, whether to determine the first type of transmission as the target type of transmission can be determined according to whether the first type of transmission meets the first preset value, or whether to determine the second type of transmission as the target type of transmission can be determined according to whether the second type of transmission meets the second preset value. For ease of description, the following description will be given in an example where whether to determine the first type of transmission as the target type of transmission is determined according to whether the first type of transmission meets the first preset value, but the same applies to the determining process for the second type of transmission. For example, it is also applicable by replacing the first type of transmission described below with the second type of transmission and replacing the first preset value with the second preset value.

Specifically, when the parameter information set of the first type transmission includes multiple pieces of parameter information, the corresponding first preset threshold may also include multiple thresholds, and there is a corresponding first preset threshold corresponding to each piece of parameter information in the parameter information set. Due to the different parameter information in the parameter information set, the parameter information set meeting the first preset threshold may indicate that the parameter information in the parameter information set is greater than, or less than, or equal to the corresponding first preset threshold.

For example, if the parameter information set of the first type of transmission includes the priority information, correspondingly, the first preset threshold includes a preset priority. For example, the parameter information set of the first type of transmission meeting the preset threshold may indicate that a priority of the sidelink transmission is higher than or equal to the preset priority, and the parameter information set not meeting the preset threshold may indicate that the priority of the sidelink transmission is lower than the preset priority or not equal to the preset priority.

For another example, the parameter information set of the first type of transmission may also include delay information, and correspondingly, the first preset threshold includes a preset delay. For example, the parameter information set of the first type transmission meeting the preset threshold indicates that a length of a delay of the sidelink transmission is less than or equal to a length of the preset delay, and the parameter information set not meeting the preset threshold indicates that the length of the delay of the sidelink transmission is greater than the length of the preset delay or not equal to the length of the preset delay.

For still another example, the parameter information set of the first type of transmission may also include reliability information, and correspondingly, the first preset threshold includes preset reliability. For example, the parameter information set of the first type of transmission meeting the preset threshold indicates that reliability of the sidelink transmission is greater than or equal to the preset reliability, and the parameter information set not meeting the preset threshold indicates that the reliability of the sidelink transmission is less than the preset reliability or not equal to the preset reliability.

For still another example, the parameter information set of the first type of transmission may also include transmission rate information, and correspondingly, the first preset threshold includes a preset transmission rate. For example, the parameter information set of the first type of transmission meeting the preset threshold indicates that a transmission rate of the sidelink transmission is greater than or equal to the preset transmission rate, and the parameter information set not meeting the preset threshold indicates that the transmission rate of the sidelink transmission is less than the preset transmission rate or not equal to the preset transmission rate.

For still another example, the parameter information set of the first type of transmission may also include throughput information, and correspondingly, the first preset threshold includes preset throughput. For example, the parameter information set of the first type of transmission meeting the preset threshold indicates that throughput of the sidelink transmission is greater than or equal to the preset throughput, and the parameter information set not meeting the preset threshold indicates that the throughput of the sidelink transmission is less than the preset throughput or not equal to the preset throughput.

For still another example, the parameter information set of the first type of transmission may also include QoS information, and correspondingly, the first preset threshold includes preset QoS. For example, the parameter information set of the first type of transmission meeting the preset threshold indicates that QoS of the sidelink transmission is higher than or equal to the preset QoS, and the parameter information set not meeting the preset threshold indicates that the QoS of the sidelink transmission is lower than the preset QoS or not equal to the preset QoS.

For still another example, the parameter information set of the first type of transmission may also include QCI information, and correspondingly, the first preset threshold includes preset QCI. For example, the parameter information set of the first type of transmission meeting the preset threshold indicates that QCI of the sidelink transmission is higher than or equal to the preset QCI, and the parameter information set not meeting the preset threshold indicates that the QCI of the sidelink transmission is lower than the preset QCI or not equal to the preset QCI.

Optionally, the parameter information set of the first type of transmission may include multiple parameters, and when it is determined whether the parameter information set meets the first preset threshold, it may be determined in turn that each piece of parameter information meets the corresponding first preset threshold, and when all the parameter information meets the corresponding first preset thresholds, it is determined that the parameter information set meets the first preset threshold, otherwise, it is determined that the parameter information set does not meet the first preset threshold. Alternatively, it can only determine whether one or more piece of the parameter information meets the corresponding first preset threshold, when the one or more piece of the parameter information meets the corresponding first preset threshold, it is determined that the parameter information set meets the first preset threshold; otherwise, it is determined that the parameter information set does not meet the first preset threshold, and the embodiments of the present disclosure are not limited thereto.

In the embodiments of the present disclosure, according to the first rule, when the parameter information set of the first type of transmission meets the preset threshold, it is determined that the first type of transmission is preferentially performed, that is, the terminal device preferentially transmits the sidelink data. For example, the terminal device determines the first type of transmission as the target type of transmission, that is, the sidelink transmission is the target type of transmission, and the terminal device performs the sidelink transmission on the target transmission resource and does not perform the second type of transmission on the target transmission resource. Alternatively, if part of the information to be transmitted in the first type of transmission meets the first preset threshold, the first type of transmission can be determined as the target type of transmission, and correspondingly, the data meeting the first preset threshold are preferentially transmitted on the target resource.

Conversely, if the parameter information set of the first type of transmission does not meet the preset threshold, or part of the information to be transmitted in the first type of transmission does not meet the first preset threshold, the terminal device will not preferentially transmit this part of data. For example, the terminal device may further determine in combination with other conditions whether the second type of transmission can be preferentially transmitted, that is, whether to preferentially transmit uplink or downlink data. If the terminal device determines the second type of transmission as the target type of transmission, that is, the uplink or downlink transmission is the target type of transmission, the terminal device can perform the uplink or downlink transmission on the target transmission resource.

Similarly, according to the first rule, when the parameter information set of the second type of transmission meets the preset threshold, the terminal device determines the second type of transmission as the target type of transmission, that is, the terminal device performs uplink or downlink transmission on the target transmission resource. For example, the terminal device determines the second type of transmission as the target type of transmission, that is, the uplink or downlink transmission is the target type of transmission, and the terminal device performs the uplink or downlink transmission on the target transmission resource, but does not perform the sidelink transmission on the target transmission resource. Alternatively, if part of the information to be transmitted in the second type of transmission meets the second preset threshold, the second type of transmission can be determined as the target type of transmission, and correspondingly, the data meeting the second preset threshold are transmitted on the target resource.

Conversely, if the parameter information set of the second type of transmission does not meet the second preset threshold, or part of the information to be transmitted in the second type of transmission does not meet the second preset threshold, the terminal device will not preferentially transmit this part of data. For example, the terminal device may further determine in combination with other conditions whether the first type of transmission can be determined as the target type of transmission, that is, whether the terminal device performs the sidelink transmission on the target transmission resource. If the terminal device determines the first type of transmission as the target type of transmission, that is, the sidelink transmission is the target type of transmission, the terminal device can perform the sidelink transmission on the target transmission resource.

Optionally, as another embodiment, the terminal device may also determine the first type of transmission or the second type of transmission as the target type of transmission according to a logical channel of the first type of transmission or a logical channel of the second type of transmission. Specifically, if the logical channel of the first type of transmission is a configured logical channel, the first type of transmission is determined as the target type of transmission, or if the logical channel of the second type of transmission is a configured logical channel, the second type of transmission is determined as the target type of transmission.

It should be understood that determining whether the logical channel corresponding to the first type of transmission or the logical channel corresponding to the second type of transmission is the configured logical channel may include determining that the logical channel corresponding to the first type of transmission is the configured logical channel if the logical channel corresponding to the first type of transmission includes a specified configuration, and determining that the logical channel corresponding to the second type of transmission is the configured logical channel if the logical channel corresponding to the second type of transmission includes the specified configuration.

Therefore, in the data transmission method according to the embodiments of the present disclosure, when the terminal device determines that the sidelink transmission and the uplink or downlink transmission are performed on the same transmission resource according to the configuration information, conflicts may occur on the transmission resource, and the terminal device can select to preferentially perform the sidelink transmission or the uplink or downlink transmission on the transmission resource according to a certain rule so as to avoid conflicts.

In the above, the data transmission method according to the embodiments of the present disclosure is described in detail in connection with FIG. 4 from the perspective of the terminal device. Correspondingly, if the network device configures the terminal device with the same transmission resource on which the sidelink transmission can be performed and the uplink or downlink transmission can also be performed, the network device can also use the same method as the terminal device to determine which transmission is preferentially performed. For example, the network device can also perform the determination according to the above first rule, if it is determined to perform the uplink or downlink transmission, the network device can receive or send data from or to the terminal device on the transmission resource. Since the network device also needs to use the same rule as the terminal device to make the determination, the method is similar to the method 200 described above, which will not be repeated here.

In the embodiments of the present disclosure, if the terminal device determines to perform the sidelink transmission and the uplink transmission on the same time domain resource according to the configuration information, the terminal device can also select to simultaneously perform the sidelink transmission and the uplink transmission on different frequency domain resources in this time domain resource according to a certain rule, thereby avoiding conflicts. Therefore, according to an embodiment of the present disclosure, there is proposed another data transmission method. Hereinafter, the data transmission method according to another embodiment of the present disclosure will be described from the perspective of a terminal device with reference to FIG. 5.

FIG. 5 shows a schematic flowchart of a data transmission method 300 according to an embodiment of the present disclosure. The method 300 may be performed by a terminal device. For example, the terminal device may be the terminal device shown in FIG. 1 or FIG. 2, which can perform uplink and downlink transmission with a network device, and can also perform sidelink transmission with other terminal devices. As shown in FIG. 5, the method 300 includes: S310, performing, by the terminal device according to a preset rule, sidelink transmission on a target transmission resource with a first power and uplink transmission on the target transmission resource with a second power when the terminal device determines, according to first configuration information, to perform the sidelink transmission with other terminal devices on the target transmission resource, and determines, according to second configuration information, to perform the uplink transmission with a network device on the target transmission resource, where a sum of the first power and the second power is less than or equal to a maximum transmission power of the terminal device.

It should be understood that prior to S310, the method 300 further includes that the first terminal device determines, according to the first configuration information, to perform sidelink transmission with other terminal devices on the target transmission resource. In addition, the method 300 further includes that terminal device determines, according to the second configuration information, to perform uplink transmission with the network device on the target transmission resource, that is, the terminal device sends uplink data to the network device. That is to say, both the uplink transmission and the sidelink transmission are configured on the same target transmission resource, and resource conflicts will occur.

Optionally, the first configuration information may be configured by the network device for the terminal device, that is, the terminal device receives the first configuration information sent by the network device. Alternatively, the first configuration information may also be pre-configuration information. For example, the first configuration information may be scheduling information or resource pool configuration information sent by the network device, and the terminal device determines to use the target resource for the sidelink transmission according to the first configuration information. For another example, the first configuration information may be pre-configured information, that is, specified in accordance with an agreement, or pre-stored on the terminal device.

Optionally, the second configuration information may be configured by the network device for the terminal device, that is, the terminal device receives the second configuration information sent by the network device. For example, the second configuration information may be Radio Resource Control (RRC) configuration information or scheduling information, and the network device configures the terminal device to use the target resource for the transmission of uplink data through the second configuration information.

It should be understood that the target transmission resource in the embodiments of the present disclosure may be a time-frequency resource, or a time domain resource. Specifically, if the target transmission resource is the time domain resource, the terminal device determines, according to the first configuration information, to use the time domain resource for the sidelink transmission, and at the same time, the terminal device determines, according to the second configuration information, to use the time domain resources for the uplink transmission, and the frequency domain resources occupied by the sidelink transmission and the frequency domain resources occupied by the uplink transmission may be the same or different.

For example, the target transmission resource may be a specific time-frequency resource, and the terminal device determines to transmit sidelink data on this time-frequency resource according to the first configuration information, and determines to transmit uplink data on this time-frequency resource according to the second configuration information, and at this point, there is a transmission resource used for both the uplink transmission and the sidelink transmission, which will cause transmission resource conflicts.

For another example, the target transmission resource is a time domain symbol, and the terminal device determines to send sidelink data on a first frequency domain resource of the time domain symbol according to the first configuration information, and determines to send uplink data on a second frequency domain resource of the time domain symbol according to the second configuration information. The first frequency domain resource and the second frequency domain resource are different.

In the embodiments of the present disclosure, since the terminal device determines to perform the sidelink transmission and the uplink transmission on the same target transmission resource according to the first configuration information and the second configuration information, the terminal device can allocate different transmission powers according to the preset rule, that is, the terminal device can use the first power for the sidelink transmission and the second power for the uplink transmission, where the sum of the first power and the second power is less than or equal to the maximum transmission power of the terminal device.

It should be understood that the preset rule may be pre-configured, for example, specified by an agreement, or the preset rule may be configured by the network device for the terminal device, and the embodiments of the present disclosure are not limited thereto.

Optionally, the preset rule may include allocating the first power and the second power according to a certain ratio. Specifically, the terminal device can determine whether to preferentially perform the sidelink transmission or the uplink transmission according to certain determination conditions. For example, the terminal device may determine an allocation ratio of the first power and the second power according to a parameter information set. If the parameter information set of the sidelink transmission meets a preset threshold, the first power of the sidelink transmission is prioritized when allocating the maximum transmission power so that the first power is closer to the requirements of the sidelink transmission, and then the second power of the terminal device for sending uplink data is adjusted based on the maximum transmission power. Conversely, if the parameter information set of the sidelink transmission does not meet the preset threshold, the second power for the uplink transmission can be prioritized when allocating the maximum transmission power so that the second power is closer to the requirements of the uplink transmission, and then the first power of the terminal device for the sidelink transmission is adjusted based on the maximum transmission power.

Optionally, as an embodiment, the preset rule may be that if the parameter information set of the sidelink transmission meets the preset threshold, the first power meets the power requirement of the sidelink transmission and the second power is equal to a difference between the maximum transmission power and the first power, or the first power is equal to the maximum transmission power and the second power is zero. If the parameter information set of the sidelink transmission does not meet the preset threshold, the second power meets the power requirement of the uplink transmission and the first power is equal to a difference between the maximum transmission power and the second power, or the second power is equal to the maximum transmission power and the first power is zero.

Specifically, the parameter information set in the embodiment of the present disclosure includes at least one of the following information: priority information, delay information, reliability information, transmission rate information, throughput information, Quality of Service (QoS) information and QoS Class Identifier (QCI) information. Optionally, based on one or more of the aforementioned priority information, delay information, reliability information, transmission rate information, throughput information, QoS information, and QCI information, the terminal device may also determine the remaining one or more information.

Optionally, the parameter information set of the sidelink transmission is a set of parameter information of data to be transmitted on the sidelink.

Optionally, the preset threshold may be configured by the network device or may be pre-configured. For example, the terminal device may receive the preset threshold sent by the network device. Alternatively, the terminal device may also obtain the preset threshold according to the pre-configured information.

When the parameter information set includes multiple pieces of parameter information, the corresponding preset threshold also includes multiple thresholds, and each parameter information in the parameter information set has a corresponding preset threshold. Due to different parameter information in the parameter information set, the parameter information set meeting the preset threshold may indicate that the parameter information in the parameter information set is greater than or less than the preset threshold.

For example, if the parameter information set includes priority information, correspondingly, the preset threshold includes a preset priority. The parameter information set of the sidelink transmission meeting the preset threshold indicates that the priority of the sidelink transmission is higher than or equal to the preset priority, and the parameter information set of the sidelink transmission not meeting the preset threshold indicates that the priority of the sidelink transmission is lower than the preset priority.

For another example, the parameter information set may also include delay information, and correspondingly, the preset threshold includes a preset delay. The parameter information set of the sidelink transmission meeting the preset threshold indicates that a length of a delay of the sidelink transmission is less than or equal to a length of the preset delay, and the parameter information set of the sidelink transmission not meeting the preset threshold indicates that the length of the delay of the sidelink transmission is greater than the length of the preset time delay.

For still another example, the parameter information set may also include reliability information, and correspondingly, the preset threshold includes preset reliability. The parameter information set of the sidelink transmission meeting the preset threshold indicates that reliability of the sidelink transmission is greater than or equal to the preset reliability, and the parameter information set not meeting the preset threshold indicates that the reliability of the sidelink transmission is less than the preset reliability.

For still another example, the parameter information set may also include transmission rate information, and correspondingly, the preset threshold includes a preset transmission rate. The parameter information set of the sidelink transmission meeting the preset threshold indicates that a transmission rate of the sidelink transmission is greater than or equal to the preset transmission rate, and the parameter information set not meeting the preset threshold indicates that the transmission rate of the sidelink transmission is less than the preset transmission rate.

For still another example, the parameter information set may also include throughput information, and correspondingly, the preset threshold includes preset throughput. The parameter information set of the sidelink transmission meeting the preset threshold indicates that throughput of the sidelink transmission is greater than or equal to the preset throughput, and the parameter information set not meeting the preset threshold indicates that the throughput of the sidelink transmission is less than the preset throughput.

For still another example, the parameter information set may also include QoS information, and correspondingly, the preset threshold includes preset QoS. The parameter information set of the sidelink transmission meeting the preset threshold indicates that QoS of the sidelink transmission is higher than or equal to the preset QoS, and the parameter information set not meeting the preset threshold indicates that the QoS of the sidelink transmission is lower than the preset QoS.

For still another example, the parameter information set may also include QCI information, and correspondingly, the preset threshold includes preset QCI. The parameter information set of the sidelink transmission meeting the preset threshold indicates that QCI of the sidelink transmission is higher than or equal to the preset QCI, and the parameter information set not meeting the preset threshold indicates that the QCI of the sidelink transmission is lower than the preset QCI.

Optionally, the parameter information set may include multiple parameters, and when it is determined whether the parameter information set meets the preset threshold, it may be determined in turn that each piece of parameter information meets the corresponding preset threshold, and when all the parameter information meets the corresponding preset thresholds, it is determined that the parameter information set meets the preset threshold, otherwise, it is determined that the parameter information set does not meet the preset threshold. Alternatively, it can only determine whether one or more piece of parameter information meets the corresponding preset threshold, and when the one or more piece of parameter information meets the corresponding preset threshold, it is determined that the parameter information set meets the preset threshold; otherwise, it is determined that the parameter information set does not meet the preset threshold, and the embodiments of the present disclosure are not limited thereto.

Optionally, if the parameter information set of the sidelink transmission meets the preset threshold, the transmission power for the sidelink data is guaranteed preferentially, that is, the power of the uplink transmission is adjusted so that the sum of the two powers is not greater than the maximum transmission power of the terminal, in other words, the first power meets the power requirement of the sidelink transmission, and then a difference between the maximum transmission power and the first power is determined as the second power. If the maximum transmission power is still not sufficient when the second power for the uplink transmission is adjusted to 0, that is, the first power is greater than the maximum transmission power, the first power may be set to the maximum transmission power, and the second power is set to zero.

Optionally, if the parameter information set of the sidelink transmission does not meet the preset threshold, the transmission power for the uplink data is guaranteed preferentially, that is, the power of the sidelink transmission is adjusted so that the sum of the two powers is not greater than the maximum transmission power of the terminal, in other words, the second power meets the power requirement of the uplink transmission, and then a difference between the maximum transmission power and the second power is determined as the first power. If the maximum transmission power is still not sufficient when the first power for the sidelink transmission is adjusted to 0, that is, the second power is greater than the maximum transmission power, the second power may be set to the maximum transmission power, and the first power is set to zero.

Optionally, in an embodiment, the terminal device simultaneously adjusts the first power and the second power according to a parameter, so that the sum of the adjusted first and second powers is less than or equal to the maximum transmission power.

Therefore, in the data transmission method according to the embodiments of the present disclosure, when the terminal device determines to perform sidelink transmission and uplink transmission on the same time domain resource according to the configuration information, the terminal device can allocate the transmission power according to a certain ratio, and perform the sidelink transmission and/or the uplink transmission in accordance with the respectively allocated powers, thereby avoiding conflicts.

In the above, the data transmission method according to the embodiments of the present disclosure is described in detail in connection with FIG. 5 from the perspective of the terminal device. Correspondingly, if the network device configures the terminal device with the same transmission resource on which the sidelink transmission can be performed and the uplink transmission can also be performed, the network device can also use the same method as the terminal device to determine the transmission manner of the terminal device. For example, the network device can also make the determination according to the above-mentioned preset rule, if it is determined to perform uplink transmission, the network device can receive the data sent by the terminal device on the corresponding transmission resource. Since the network device also needs to use the same rule as the terminal device to make the determination, the method is similar to the method 300 described above, which will not be repeated here.

It should be understood that in the embodiments of the present disclosure, the sequence number of the above-mentioned processes does not mean the performing order, and the performing order of the processes should be determined according to the functions and the internal logic thereof, and should not be limited in the implementations of the embodiments of the present disclosure.

In addition, the term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

The data transmission method according to the embodiments of the present disclosure is described in detail above with reference to FIGS. 1 to 5, and the terminal device according to the embodiments of the present disclosure will be described below with reference to FIGS. 6 to 10.

Figure 6:
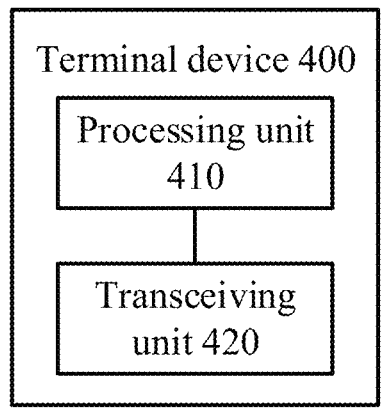
FIG. 6 is a schematic block diagram of a terminal device according to an embodiment of the present disclosure.

As shown in FIG. 6, the terminal device 400 according to an embodiment of the present disclosure includes: a processing unit 410 and a transceiving unit 420. Specifically, the processing unit 410 is configured to determine, according to a first rule, a first type of transmission or a second type of transmission as a target type of transmission when it is determined, according to first configuration information, to perform the first type of transmission on a target transmission resource and it is determined, according to second configuration information, to perform the second type of transmission on the target transmission resource, where the first type of transmission is sidelink transmission between the terminal device and other terminal devices, and the second type of transmission is uplink transmission or downlink transmission between the terminal device and a network device. The transceiving unit 420 is configured to perform data transmission with the target type of transmission on the target transmission resource.

Optionally, as an embodiment, the target transmission resource is a time domain resource.

Optionally, as an embodiment, the first rule is to determine the first type of transmission as the target type of transmission, or to determine the second type of transmission as the target type of transmission.

Optionally, as an embodiment, the first rule is that if a parameter information set of the first type of transmission meets a first preset threshold, the first type of transmission is determined as the target type of transmission, and if the parameter information set of the first type of transmission does not meet the first preset threshold, the second type of transmission is determined as the target type of transmission.

Optionally, as an embodiment, the transceiving unit 420 is further configured to receive the first preset threshold sent by the network device. Alternatively, the processing unit 410 is further configured to obtain the first preset threshold according to pre-configuration information.

Optionally, as an embodiment, the first rule is that if the parameter information set of the second type of transmission meets a second preset threshold, the second type of transmission is determined as the target type of transmission.

Optionally, as an embodiment, the processing unit 410 is further configured to determine the parameter information set of the second type of transmission according to attribute information of a logical channel of the second type of transmission.

Optionally, as an embodiment, the transceiving unit 420 is further configured to receive the preset threshold sent by the network device. Alternatively, the processing unit 410 is further configured to obtain the preset threshold according to pre-configured information.

Optionally, as an embodiment, the parameter information set includes at least one of the following information: priority information, delay information, reliability information, transmission rate information, throughput information, QoS information, and QCI information.

Optionally, as an embodiment, the first rule is that if a logical channel of the first type of transmission is a configured logical channel, the first type of transmission is determined as the target type of transmission, or if a logical channel of the second type of transmission is the configured logical channel, and the second type of transmission is determined as the target type of transmission.

Optionally, as an embodiment, the transceiving unit 420 is further configured to receive the first configuration information sent by the network device, or the processing unit 410 is further configured to obtain the first configuration information according to pre-configured information.

Optionally, as an embodiment, the transceiving unit 420 is further configured to receive the second configuration information sent by the network device.

Optionally, as an embodiment, the transceiving unit 420 is further configured to receive the first rule sent by the network device, or the processing unit 410 is further configured to obtain the first rule according to pre-configured information.

It should be understood that the terminal device 400 according to the embodiment of the present disclosure may correspondingly perform the method 200 in the embodiments of the present disclosure, and the foregoing and other operations and/or functions of each unit in the terminal device 400 are to implement the corresponding process of the terminal device in the method of FIG. 4, which will not be repeated here for the sake of brevity.

Therefore, according to the terminal device in the embodiments of the present disclosure, when the terminal device determines to perform sidelink transmission and uplink transmission on the same time domain resource according to the configuration information, the terminal device can allocate the transmission power according to a certain ratio, and perform the sidelink transmission and/or the uplink transmission in accordance with the respectively allocated powers, thereby avoiding conflicts.

Figure 7:
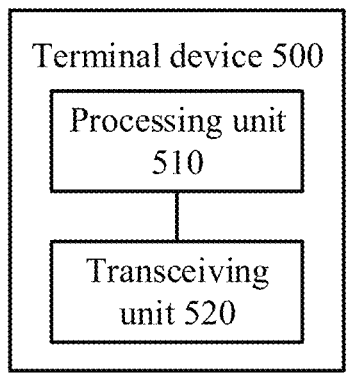
FIG. 7 is a schematic block diagram of another terminal device according to an embodiment of the present disclosure.

As shown in FIG. 7, the terminal device 500 according to an embodiment of the present disclosure includes a processing unit 510 and a transceiving unit 520. Specifically, the transceiving unit 520 is configured to perform, according to a preset rule, sidelink transmission on a target transmission resource with a first power and uplink transmission on the target transmission resource with a second power when the processing unit 510 determines, according to first configuration information, to perform the sidelink transmission with other terminal devices on the target transmission resource, and determines, according to second configuration information, to perform the uplink transmission with a network device on the target transmission resource, where a sum of the first power and the second power is less than or equal to a maximum transmission power of the terminal device.

Optionally, as an embodiment, the target transmission resource is a time domain resource, and the processing unit 510 is further configured to determine, according to the first configuration information, to perform the sidelink transmission on a first frequency domain resource of the time domain resource, and determine, according to the second configuration information, to perform the uplink transmission on a second frequency domain resource of the time domain resource, where the first frequency domain resource is different from the second frequency domain resource.

Optionally, as an embodiment, the preset rule is that if a parameter information set of the sidelink transmission meets a preset threshold, the first power meets a power requirement of the sidelink transmission and the second power is equal to a difference between the maximum transmission power and the first power, or the first power is equal to the maximum transmission power and the second power is zero; and if the parameter information set of the sidelink transmission does not meet the preset threshold, the second power meets a power requirement of the uplink transmission and the first power is equal to a difference between the maximum transmission power and the second power, or the second power is equal to the maximum transmission power and the first power is zero.

Optionally, as an embodiment, the parameter information set includes at least one of the following information: priority information, delay information, reliability information, transmission rate information, throughput information, quality of service (QoS) information, and QoS Class Identifier (QCI) information.

Optionally, as an embodiment, the transceiving unit 520 is further configured to receive the preset threshold sent by the network device, or the processing unit 510 is further configured to obtain the preset threshold according to pre-configured information.

It should be understood that the terminal device 500 according to the embodiment of the present disclosure may correspondingly perform the method 300 in the embodiments of the present disclosure, and the foregoing and other operations and/or functions of each unit in the terminal device 500 are to implement the corresponding process of the terminal device in the method of FIG. 5, which will not be repeated here for the sake of brevity.

Therefore, according to the terminal device in the embodiments of the present disclosure, when the terminal device determines to perform sidelink transmission and uplink transmission on the same time domain resource according to the configuration information, the terminal device can allocate the transmission power according to a certain ratio, and perform the sidelink transmission and/or the uplink transmission in accordance with the respectively allocated powers, thereby avoiding conflicts.

Figure 8:
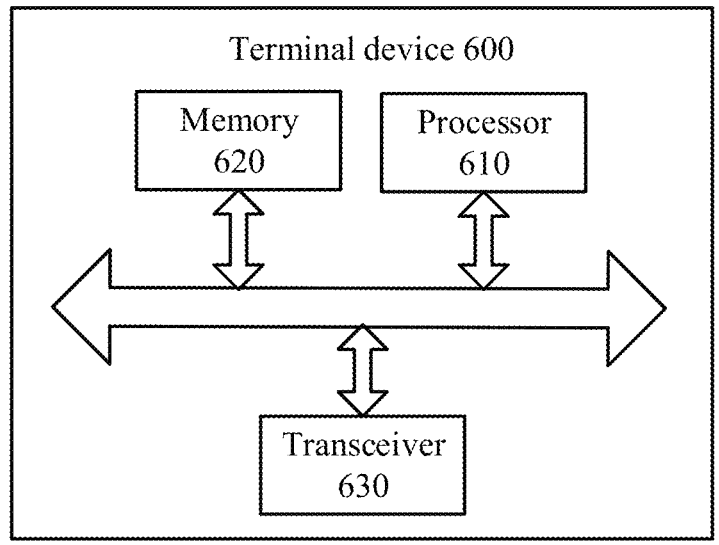
FIG. 8 is a schematic block diagram of a communication device according to an embodiment of the present disclosure.

FIG. 8 is a schematic structural diagram of a communication device 600 according to an embodiment of the present disclosure. The communication device 600 shown in FIG. 8 includes a processor 610. The processor 610 can call and execute a computer program from a memory to carry out the methods in the embodiments of the present disclosure.

Optionally, as shown in FIG. 8, the communication device 600 can further include a memory 620. The processor 610 can invoke and run the computer program from the memory 620 to carry out the methods in the embodiments of the present disclosure.

The memory 620 can be a separate device independent of the processor 610, or can be integrated in the processor 610.

Optionally, as shown in FIG. 8, the communication device 600 can further include a transceiver 630, and the processor 610 can control the transceiver 630 to communicate with other devices, and specifically, to transmit information or data to other devices, or receive information or data transmitted from other devices.

The transceiver 630 can include a transmitter and a receiver. The transceiver 630 can further include one or more antennas.

Optionally, the communication device 600 can specifically be a network device in the embodiments of the present disclosure, and the communication device 600 can carry out the corresponding processes which are implemented by the network device in the methods of the embodiments of the present disclosure, which will not be repeated here for the sake of brevity.

Optionally, the communication device 600 can specifically be a mobile terminal/terminal in the embodiments of the present disclosure, and the communication device 600 can implement the corresponding processes which are implemented by the mobile terminal/terminal in the methods according to the embodiments of the present disclosure, which will not be repeated here for the sake of brevity.

Figure 9:
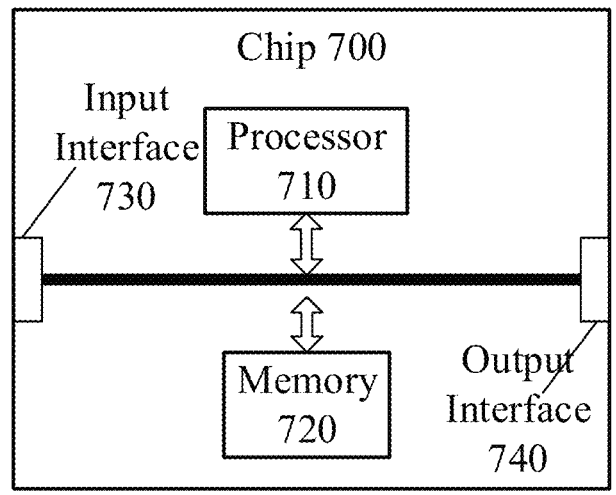
FIG. 9 is a schematic block diagram of a chip according to an embodiment of the present disclosure.

FIG. 9 is a schematic structural diagram of a chip according to an embodiment of the present disclosure. The chip 700 shown in FIG. 9 includes a processor 710 which can invoke and run a computer program from a memory to implement the methods in the embodiments of the present disclosure.

Optionally, as shown in FIG. 9, the chip 700 can further include a memory 720. The processor 710 can invoke and run the computer program from the memory 720 to implement the methods in the embodiments of the present disclosure.

The memory 720 can be a separate device independent of the processor 710, or can be integrated in the processor 710.

Optionally, the chip 700 can further include an input interface 730. The processor 710 can control the input interface 730 to communicate with other devices or chips, and particularly to obtain information or data transmitted by other devices or chips.

Optionally, the chip 700 can further include an output interface 740. The processor 710 can control the output interface 740 to communicate with other devices or chips, and particularly to output information or data to other devices or chips.

Optionally, the chip can be applied to the network device in the embodiments of the present disclosure, and the chip can carry out the corresponding processes which are implemented by the network device in the methods of the embodiments of the present disclosure, which will not be repeated here for the sake of brevity.

Optionally, the chip can be applied to the mobile terminal/terminal device in the embodiments of the present disclosure, and the chip can implement the corresponding processed which are implemented by the mobile terminal/terminal device in the methods of the embodiments of the present disclosure, which will not be repeated here for the sake of brevity.

It should be understood that the chip mentioned in the embodiments of the present disclosure can also be referred to as a system-level chip, a system chip, a chip system, or a system-on-chip.

Figure 10:
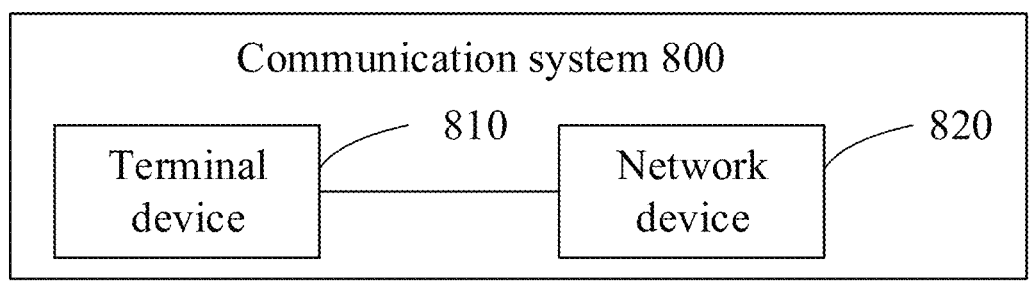
FIG. 10 is a schematic block diagram of a communication system according to an embodiment of the present disclosure.

FIG. 10 is a schematic block diagram of a communication system 800 according to an embodiment of the present disclosure. As shown in FIG. 10, the communication system 800 includes a terminal device 810 and a network device 820.

The terminal device 810 can be used to implement the corresponding functions implemented by the terminal device in the above methods, and the network device 820 can be used to implement the corresponding functions implemented by the network device in the above methods, which will not be repeated here for the sake of brevity.

It should be understood that the processor according to the embodiments of the present disclosure can be an integrated circuit chip with signal processing capability. In the implementations, the steps of the foregoing method embodiments can be performed by an integrated logic circuit of hardware in the processor or by instructions in a form of software. The foregoing processor can be a general-purpose processor, a Digital Signal Processor (DSP), an Application Specific Integrated Circuit (ASIC), a Field Programmable Gate Array (FPGA), another programmable logic device, discrete gate or transistor logic device, or a discrete hardware component, which can implement the methods, steps, and logical blocks disclosed in the embodiments of the present disclosure. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present disclosure may be a volatile memory or a non-volatile memory, or may include both the volatile and non-volatile memories. In an embodiment, the non-volatile memory can be a Read-Only Memory (ROM), a Programmable ROM (PROM), an erasable PROM (EPROM), an electrically EPROM (EEPROM) or a flash memory. The volatile memory may be a Random Access Memory (RAM), which is used as an external cache. By way of exemplary but not restrictive description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM)) and a Direct Rambus RAM (DR RAM). It should be noted that the memories of the systems and methods described herein are intended to include, but are not limited to, these and any other suitable types of memories.

It should be understood that the foregoing description of the memory is exemplary rather than limiting. For example, the memory in the embodiments of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

The embodiments of the present disclosure also provide a computer-readable storage medium for storing a computer program.

Optionally, the computer-readable storage medium can be applied to the network device in the embodiments of the present disclosure, and the computer program causes a computer to perform the corresponding processes which are implemented by the network device in the methods of the embodiments of the present disclosure, which will not be repeated here for the sake of brevity.

Optionally, the computer-readable storage medium can be applied to the mobile terminal/terminal device in the embodiments of the present disclosure, and the computer program causes a computer to perform the corresponding processes which are implemented by the mobile terminal/terminal device in the methods of the embodiments of the present disclosure, which will not be repeated here for the sake of brevity.

The embodiments of the present disclosure also provide a computer program product including computer program instructions.

Optionally, the computer program product can be applied to the network device in the embodiments of the present disclosure, and the computer program instructions cause a computer to perform the corresponding processes implemented by the network device in the methods of the embodiments of the present disclosure, which will not be repeated here for the sake of brevity.

Optionally, the computer program product can be applied to the mobile terminal/terminal device in the embodiments of the present disclosure, and the computer program instructions cause a computer to perform the corresponding processes which are implemented by the mobile terminal/terminal device in the methods of the embodiments of the present disclosure, which will not be repeated here for the sake of brevity.

The embodiments of the present disclosure also provide a computer program.

Optionally, the computer program can be applied to the network device in the embodiments of the present disclosure, and when running on a computer, the computer program causes the computer to perform the corresponding process implemented by the network device in the methods of the embodiments of the present disclosure, which will not be repeated here for the sake of brevity.

Optionally, the computer program can be applied to the mobile terminal/terminal device in the embodiments of the present disclosure, and when running on a computer, the computer program causes the computer to perform the corresponding processes implemented by the mobile terminal/terminal device in the methods of the embodiments of the present disclosure, which will not be repeated here for the sake of brevity.

Those of ordinary skill in the art can recognize that the exemplary units and algorithm steps described in connection with the embodiments disclosed herein can be implemented in electronic hardware or a combination of computer software and the electronic hardware. Whether these functions are implemented in hardware or software depends on the specific present disclosures of the technical solutions and design constraints. Various methods can be used by professional technicians to implement the described functions for each specific application, and such implementations should not be considered as going beyond the scope of the present disclosure.

Those skilled in the art can clearly understand that for the convenience and conciseness of the description, for the specific operating process of the systems, devices and units described above, reference can be made to corresponding process in the foregoing method embodiments, which will not be repeated here.

It should be understood that the systems, devices, and methods disclosed in several embodiments of the present disclosure can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may be or may not be physically separated, and the components shown as units may be or may not be physical units, that is, they may be located in one place or may be distributed on multiple network units. Some or all of the units can be selected to achieve the objectives of the solutions of the embodiments according to actual requirements.

In addition, the functional units in the embodiments of the present disclosure can be integrated into one processing unit, or each unit can individually exist physically, or two or more of the units can be integrated into one unit.

If implemented in the form of software functional units and sold or used as an independent product, the functions can be stored in a computer-readable storage medium. Based on such understanding, the technical solution of the present disclosure essentially, a part thereof that contributes to the prior art, or a part of the technical solution can be embodied in the form of a software product, and the computer software product is stored in a storage medium and includes instructions which enable a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. A method for data transmission, comprising:
   obtaining, by a terminal device, first configuration information, wherein the first configuration information is used to indicate to perform a first type of transmission on a target transmission resource, and the first type of transmission is sidelink transmission between the terminal device and another terminal device;
   obtaining, by the terminal device, second configuration information, wherein the second configuration information is used to indicate to perform a second type of transmission on the target transmission resource, and the second type of transmission is uplink transmission between the terminal device and a network device;
   determining, by the terminal device according to a first rule, the first type of transmission or the second type of transmission as a target type of transmission; and
   performing data transmission with the target type of transmission on the target transmission resource,
   wherein the target transmission resource is an uplink symbol or flexible symbol in a slot structure configured by the network device, and
   wherein the first rule comprises:

when a logical channel corresponding to the second type of transmission comprises a specified configuration, determining that the logical channel corresponding to the second type of transmission is a configured logical channel; and determining the second type of transmission as the target type of transmission in response to determining that the logical channel corresponding to the second type of transmission is the configured logical channel.

2. The method according to claim 1, wherein the first rule comprises:

determining the first type of transmission as the target type of transmission when a parameter information set of the first type of transmission meets a first preset threshold; and determining the second type of transmission as the target type of transmission when the parameter information set of the first type of transmission does not meet the first preset threshold.

3. The method according to claim 2, further comprising:
receiving, by the terminal device, the first preset threshold sent by the network device; or obtaining, by the terminal device, the first preset threshold according to pre-configured information.

4. The method according to claim 2, wherein the parameter information set comprises priority information.

5. The method according to claim 1, wherein the first rule comprises:

determining the second type of transmission as the target type of transmission when a parameter information set of the second type of transmission meets a second preset threshold.

6. The method according to claim 5, wherein the first rule further comprises:

determining the first type of transmission as the target type of transmission when the parameter information set of the second type of transmission does not meet the second preset threshold and a parameter information set of the first type of transmission meets a first preset threshold.

7. The method according to claim 5, wherein the second preset threshold is pre-configured.

8. The method according to claim 1, further comprising:
when the first type of transmission or the second type of transmission comprises transmission of a feedback channel, determining parameter information in a parameter information set of the feedback channel according to an attribute of a logical channel corresponding to a data channel corresponding to feedback information in the feedback channel.

9. The method according to claim 1, further comprising:
receiving, by the terminal device, the first configuration information sent by the network device.

10. The method according to claim 1, further comprising:
receiving, by the terminal device, the second configuration information sent by the network device.

11. The method according to claim 1, further comprising:
obtaining, by the terminal device, the first rule according to pre-configured information.

12. A terminal device, comprising:
a processor configured to obtain first configuration information, wherein the first configuration information is used to indicate to perform a first type of transmission on a target transmission resource, and wherein the first type of transmission is sidelink transmission between the terminal device and another terminal device;

the processor configured to obtain second configuration information, wherein the second configuration information is used to indicate to perform a second type of transmission on the target transmission resource, and wherein the second type of transmission is uplink transmission between the terminal device and a network device;

the processor configured to determine, according to a first rule, the first type of transmission or the second type of transmission as a target type of transmission; and a transceiver configured to perform data transmission with the target type of transmission on the target transmission resource, wherein the target transmission resource is an uplink symbol or flexible symbol in a slot structure configured by the network device, and wherein the first rule comprises:

when a logical channel corresponding to the second type of transmission comprises a specified configuration, determining that the logical channel corresponding to the second type of transmission is a configured logical channel; and determining the second type of transmission as the target type of transmission in response to determining that the logical channel corresponding to the second type of transmission is the configured logical channel.

13. The terminal device according to claim 12, wherein the first rule comprises:

determining the first type of transmission as the target type of transmission when a parameter information set of the first type of transmission meets a first preset threshold; and determining the second type of transmission as the target type of transmission when the parameter information set of the first type of transmission does not meet the first preset threshold.

14. The terminal device according to claim 13, wherein the transceiver is further configured to receive the first preset threshold sent by the network device; or the processor is further configured to obtain the first preset threshold according to pre-configured information.

15. The terminal device according to claim 13, wherein the parameter information set comprises priority information.

16. The terminal device according to claim 12, wherein the first rule comprises:

determining the second type of transmission as the target type of transmission when a parameter information set of the second type of transmission meets a second preset threshold.

17. The terminal device according to claim 16, wherein the first rule further comprises:

determining the first type of transmission as the target type of transmission when the parameter information set of the second type of transmission does not meet the second preset threshold and a parameter information set of the first type of transmission meets a first preset threshold.

18. The terminal device according to claim 16, wherein the second preset threshold is pre-configured.

19. The terminal device according to claim 12, wherein the processor is further configured to:

when the first type of transmission or the second type of transmission comprises transmission of a feedback channel, determine parameter information in a parameter information set of the feedback channel according to an attribute of a logical channel corresponding to a data channel corresponding to feedback information in the feedback channel.

20. The terminal device according to claim 12, wherein the transceiver is further configured to:

receive the first configuration information and the second configuration information sent by the network device.

\* \* \* \* \*